United States Patent [19]

Glorioso

[11] 4,042,800
[45] Aug. 16, 1977

[54] WELDING APPARATUS

[75] Inventor: Paul A. Glorioso, Amherst, Ohio

[73] Assignee: TRW Inc., Cleveland, Ohio

[21] Appl. No.: 656,188

[22] Filed: Feb. 9, 1976

[51] Int. Cl.² .............................................. B23K 9/20
[52] U.S. Cl. .................................. 219/98; 219/131 R
[58] Field of Search ................... 219/98, 99, 109, 110, 219/131 R

[56] References Cited

U.S. PATENT DOCUMENTS

| | | | |
|---|---|---|---|
| 2,149,558 | 3/1939 | Stansbury et al. | 219/109 |
| 2,897,444 | 7/1959 | Garscia et al. | 219/110 |
| 3,034,057 | 5/1962 | Ferguson | 219/109 |
| 3,162,747 | 12/1964 | Netzsch | 219/110 |
| 3,194,939 | 7/1965 | Hill | 219/110 |
| 3,497,664 | 2/1970 | Vanderhelst | 219/110 |
| 3,673,377 | 6/1972 | Erdmann-Jesnitzer et al. | 219/131 |
| 3,717,865 | 2/1973 | Hughes, Jr. | 219/109 |

FOREIGN PATENT DOCUMENTS 1,146,156  3/1969  United Kingdom .................. 219/98

OTHER PUBLICATIONS

J. Markus, *Sourcebook of Electronic Circuits*, June 1969, p. 787.

*Primary Examiner*—J. V. Truhe
*Assistant Examiner*—Clifford C. Shaw
*Attorney, Agent, or Firm*—Allen D. Gutchess, Jr.

[57] ABSTRACT

Apparatus for indicating the time and welding current of a welding cycle is provided, along with means for monitoring the welding current and for preventing further welding cycles if the current is outside certain preset limits. The invention is used with stud welding apparatus in which a stud is placed against a workpiece, then withdrawn, and at the same time a pilot arc is formed; subsequently, a main welding arc is established which forms pools of molten metal on the stud and on the workpiece, the metal solidifying when the stud is subsequently plunged against the workpiece, thereby completing the weld. The length of time of the welding cycle and the welding current flowing during the existence of the main welding arc have, of course, heretofore been measured under laboratory conditions. However, such has not been accomplished under field conditions with commercial stud welding apparatus and particularly where such is accomplished by measuring both the welding time and welding current on a single meter. In a preferred form, the time and current values are stored through the use of relatively low-cost capacitors to make the invention even more practical. In addition, the average weld current is sensed after the weld is complete and further welds can be prevented if this current is not within certain limits.

5 Claims, 3 Drawing Figures

WELDING APPARATUS

This invention relates to apparatus for indicating the time and welding current of a welding cycle and for preventing further welds if the welding current is outside certain limits.

In a welding cycle of the type to which the invention relates, a stud with a weldable end is placed with the end in electrical contact with a workpiece to which it is to be welded. The stud is then retracted as a relatively low current pilot arc is formed between the stud and the workpiece. After the stud is retracted, a main weld current is superimposed on the pilot arc to form a main welding arc. This main arc causes portions of the stud end and the adjacent area of the workpiece to become molten. The stud is then plunged forward and engages the workpiece with the molten metal portions joining and solidifying to provide a secure weld between the stud and the workpiece.

Both the magnitude of the main welding current and the length of time the current flows to maintain the main welding arc are important to the achievement of a strong, effective weld. When the time and current can be maintained at preselected values or specifications, high quality welds can be assured. Heretofore, good welds were primarily obtained by a trial and error technique in which the time and current were adjusted until the desired weld was obtained. However, in many installations, nuclear power plants being a prime example, the ultimate welds are desired initially on a 100 percent basis from furnished specifications.

To accomplish the above, it is necessary that the time and the welding current of a welding cycle be known to the operator. While these factors have been heretofore measured under laboratory conditions, there has been no practical and economical way to accomplish this in the field with commercially available equipment. In accordance with the present invention, however, both the time of a welding cycle and the magnitude of the welding current can be determined by the use of but a single meter. Further, the time and the voltage can be sensed through the use of capacitors, one of which is charged to a value indicating the average magnitude of the weld current during the welding cycle and the other of which is charged continuously at a constant rate during the welding cycle with the final charge thus being determinate of the length of the cycle. The use of capacitors further provides a low-cost indicating system which renders it practical for commercial use.

Electronic timing devices now used to determine the length of the welding cycle are so accurate that the time need not be monitored. In other words, when a time is set on the welding controls, it is assured that that time will be achieved for the welding cycle. On the other hand, the value of the welding current is subject to substantial variation. Such variation can result from fluctuations in the power source, length of welding cable, ambient temperatures, etc. Consequently, the present invention provides monitoring means for not only indicating the value of the average weld current but for preventing further welding cycles in the event that current is outside preset limits.

It is, therefore, a principal object of the invention to provide a welding system having the advantages discussed above.

Many other objects and advantages of the invention will be apparent from the following detailed description of preferred embodiments thereof, reference being made to the accompanying drawings, in which.

Figure 1:
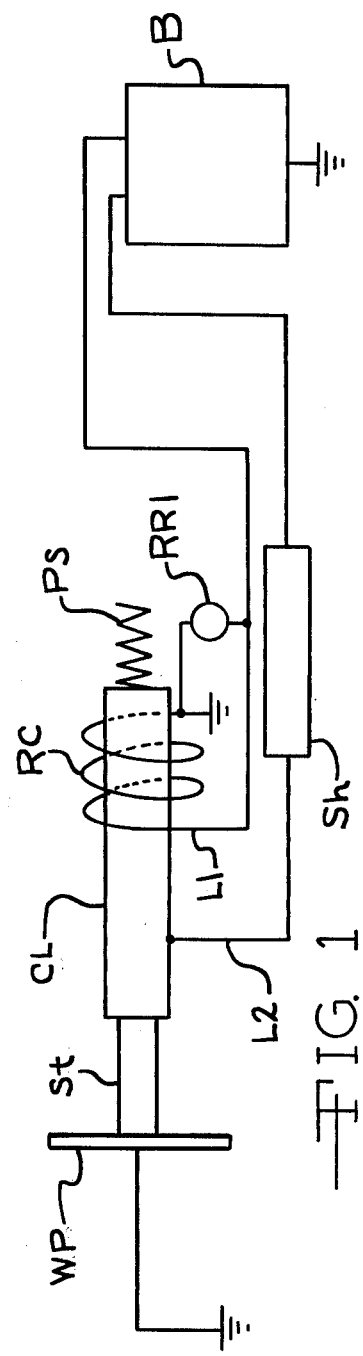
FIG. 1 is a schematic view of stud welding apparatus to which the invention relates.

The invention is designed for use with a welding tool for welding a stud to a workpiece by an end-welding, drawn-arc technique. Referring to FIG. 1, a tool of this type includes an electrical retraction coil RC which retracts a stud St from a workpiece WP by withdrawing a chuck leg CL when the coil is energized. The stud and chuck leg are then held retracted as long as the coil is energized. The tool also includes a plunge spring PS for moving the stud back against the workpiece when the coil is deenergized. As the stud is retracted from the workpiece after initial contact therewith, a low current is imposed across the stud and the workpiece to form a pilot arc as the stud is withdrawn. Subsequently, a higher current is imposed across the stud and the workpiece to establish a main welding arc therebetween. This welding arc melts a portion of the stud end and a portion of the adjacent workpiece, with the molten metal portions then joining and solidifying as the stud engages the workpiece again upon completion of the plunge stroke, to provide a secure weld between them. Power for the retraction coil RC is supplied through a line L1 and power for the pilot arc and the main welding arc is supplied through a line L2 connected to the chuck leg CL. These lines are connected to a combination control and power supply box designated B. A shunt Sh is located in the line L2 while a first reed relay RR1 is connected across the retraction coil RC and is energized as long as power is supplied to the coil.

Heretofore, the welding current and the time of the welding cycle have not been measured, except under laboratory conditions. Rather, the determination of the proper weld current and welding cycle time for a secure weld for any particular type and size of stud has been achieved through trial and error. That is, the studs were welded under varying conditions until the best weld was achieved. However, with the instant invention, the weld current and time can be indicated on a meter for any particular weld through circuitry and components which are relatively inexpensive and yet reliable. Welds at the desired settings can then be repeated after the settings are known to the operator, either through testing or through furnished specifications.

Figure 2:
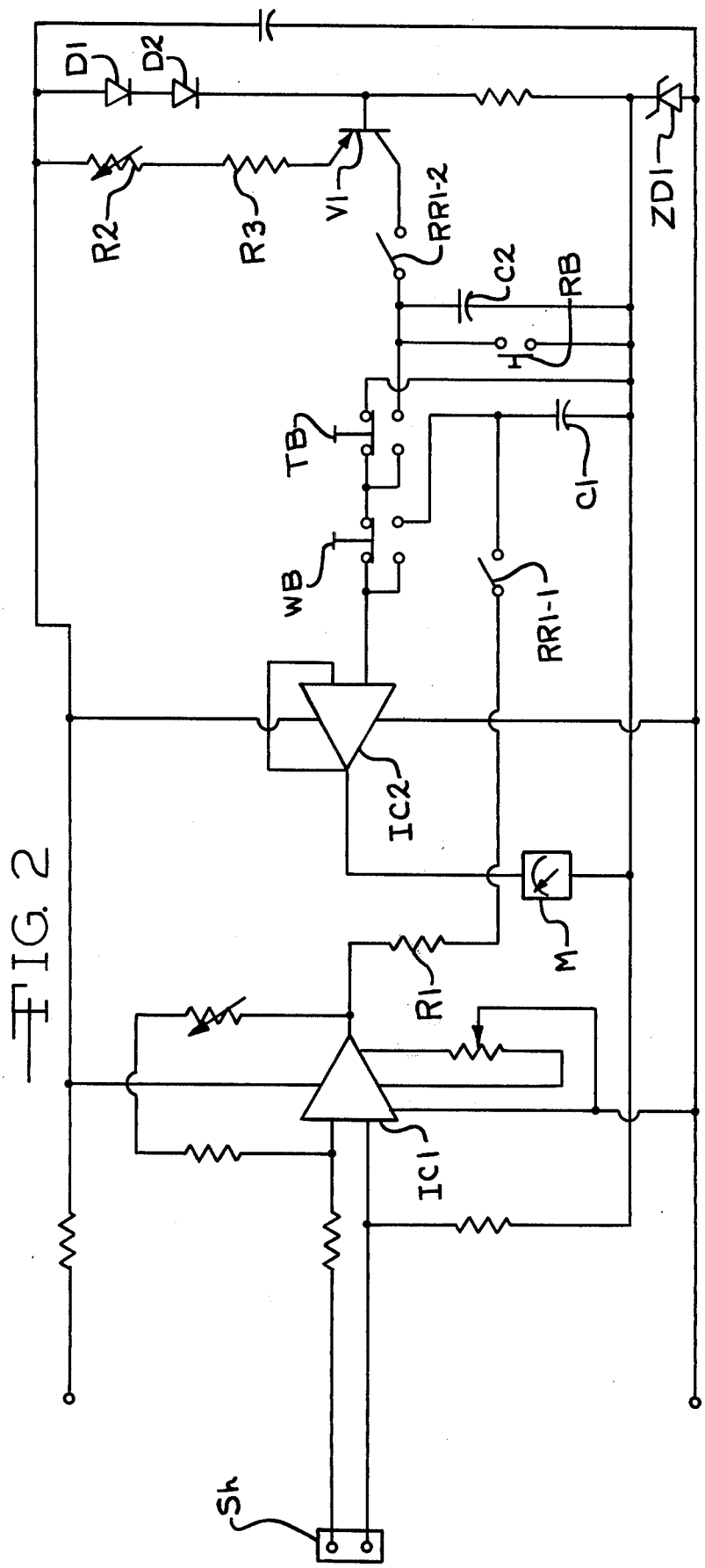
FIG. 2 is a diagrammatic view of a circuit for indicating the time and welding current of a welding cycle.

Referring to FIG. 2, output from the shunt Sh is amplified by an operational amplifier IC1 with its output averaged by a resistor R1 and a capacitor C1. A zener diode ZD1 provides bias voltage for the amplifier IC1. The capacitor C1 is connected to the amplifier IC1 through contacts RR1-1 of the reed relay, which contacts close when the coil RC is energized. The voltage to which the capacitor C1 is charged while the contacts RR1-1 are closed thus represents the average weld current through the shunt during the weld cycle. Actually, the weld cycle is slightly longer than the period of time the coil RC is energized. This is because the weld cycle includes the plunging of the stud St after the coil RC is deenergized. However, the time of the plunging of the stud is short and substantially constant, so that the period of energization of the coil RC gives a sufficient indication of the length of the weld cycle for all practical purposes. A reed switch can be employed adjacent the weld current conductor L2 or the shunt S$h$ in place of the reed relay RR1. The reed switch would then be actuated as long as weld current flows. This would indicate a longer cycle time because the weld current continues to flow after the stud begins the plunge and until it contacts the workpiece. The average weld current would also be higher since it would include the sharp peak of weld current which occurs when a dead short exists momentarily as the stud contacts the workpiece.

For indicating the length of time of the welding cycle, a constant current source is provided which consists of a calibration resistor R2, a resistor R3, diodes D1 and D2, and a transistor V1. When contacts RR1-2 of the read relay RR1 are closed with the coil RC energized, a capacitor C2 is charged by the constant current at a linear rate with the magnitude of the charge on the capacitor C2 thereby being a function of time. Charging continues until the retraction coil RC of the welding tool is deenergized and the reed relay RR1 is deactivated with the contacts RR1-1 and RR1-2 opening again. The charge resulting on the capacitor C2 thus is representative of the length of the weld cycle.

The average weld current and the time of the welding cycle are both read on a single meter designated M after the weld cycle is over. In order to read the weld current on the meter, a weld button WB is pressed to connect the capacitor C1 to a meter amplifier IC2 which amplifies the voltage to the meter M. The meter then indicates the voltage on the capacitor C1 which represents the average weld current.

To read the length of the weld cycle, a time button TB is pressed. This connects the capacitor C2 with the amplifier IC2 which applies the voltage to the meter M. Voltage on the meter M thus indicates the length of the weld cycle, the magnitude of the voltage being a function of time. A reset button RB can be pressed to discharge and reset the capacitor C2 prior to each weld.

Figure 3:
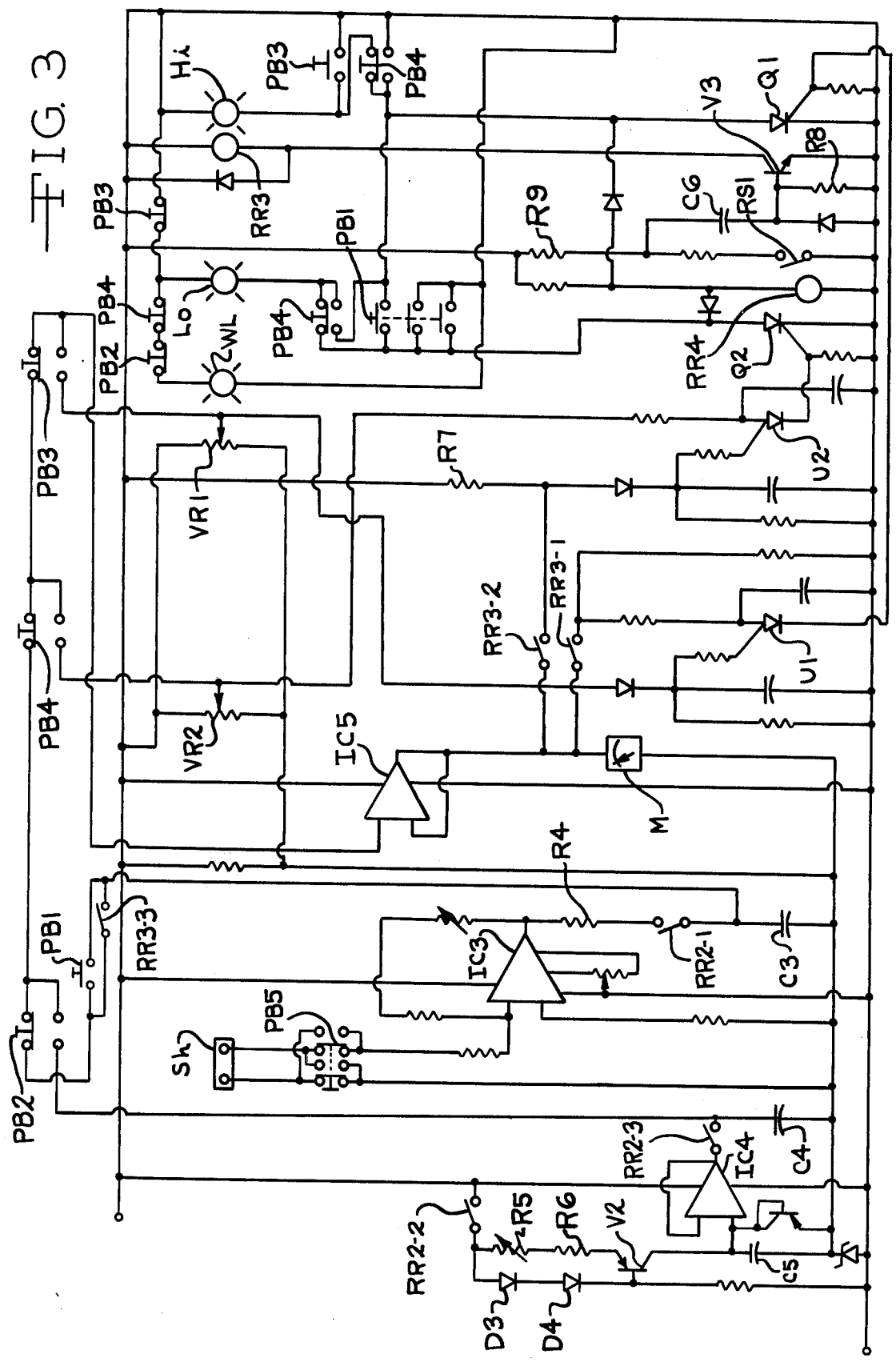
FIG. 3 is a diagrammatic view of a circuit for indicating the time and welding current of a welding cycle and for preventing further cycles if the magnitude of the weld current is outside a predetermined range of values.

The circuit of FIG. 3 has basic similarities to that of FIG. 2. However, the circuit of FIG. 3 enables certain limitations to be set on parameters of the welding cycle to prevent further welds if such are exceeded. This circuit also automatically resets the time-function capacitor without requiring manual reset.

Output from the same shunt Sh is amplified by an operational amplifier IC3 similar to IC1, with that output averaged by a resistor R4 and a capacitor C3. The capacitor C3 is connected to the amplifier IC3 through contacts RR2-1 of a reed relay which can be located across the retraction coil RC, similarly to the relay RR1, or can be a reed switch adjacent a weld current conductor. The voltage on the capacitor C3 thus represents the average current sensed by the shunt during the welding cycle or, again, actually while the retraction coil RC is energized.

For the time of the welding cycle, in this instance, a constant current supply is again provided, not only for a capacitor C4 but also for a capacitor C5. The constant current source includes a calibration resistor R5, a resistor R6, diodes D3 and D4, and a transistor V2. The capacitors C4 and C5 are charged when contacts RR2-2 and RR2-3 of the relay RR2 are closed. The capacitor C4 is also connected through an amplifier IC4 when the additional contacts RR2-3 of the reed relay RR2 are closed. This capacitor thus stores voltage equivalent to that of the capacitor C5 during the weld cycle. At the end of the weld cycle, with the reed relay contacts open, the voltage of the capacitor C5 is discharged but the voltage of the capacitor C4 remains equal to that to which the capacitor C5 was charged during the welding cycle. When the next weld begins, the capacitor C4 is discharged by the amplifier IC4 and immediately starts recharging. Thus, this arrangement eliminates the need for the manual reset for the time capacitor C4.

A meter amplifier IC5 amplifies the current from the capacitors C3 and C4 for the meter M, as does the amplifier IC2. Similarly, the voltage of capacitor C3, representing average current, is read on the meter M when a push button PB1 is pressed. During this time, a signal lamp WL is lighted to show that weld current is being indicated on the meter M. Likewise, the voltage of the capacitor C4, representing time, is read on the meter M when a push button PB2 is pressed.

In addition to the automatic reset, with the circuit of FIG. 3, the average weld current is also monitored and if it is above or below preset limits, a signal is actuated and another weld cycle is prevented. The monitoring does not occur during the weld cycle because of fluctuations in the weld current. For monitoring, two unijunction transistors U1 and U2 are employed; these are wired as voltage comparators. The transistor U1 monitors the high limit of welding current and the transistor U2 monitors the low limit of welding current. The value of the high setting is determined by a variable resistor VR1 which is located on the front panel of the control unit and which is adjusted to set the gate of the transistor U1. The low value setting for the transistor U2 is determined by a variable resistor VR2 which is also located on the front panel of the control unit and which sets the anode voltage of the transistor U2. The gate of the transistor U2 is held at full supply voltage through a resistor R7. The setting of the variable resistor VR1 can be read on the meter M when a push button switch PB3 is closed and the setting of the variable resistor VR2 similarly can be read when a push button switch PB4 is closed.

During the welding cycle, the unijunction transistors U1 and U2 are nonfunctioning, but contacts RS1 of a read switch are closed. This switch is located adjacent a welding conductor which can be either the line L2 or the shunt S$h$. When the weld current ceases and the weld cycle is over, the reed switch contacts RS1 open and start a timing circuit. This includes a transistor V3, a capacitor C6, and resistors R8 and R9. When the contacts open, the capacitor C6 is charged and causes the transistor V3 to conduct for a preset period of time, such as 20 milliseconds. During this time, the transistor V3 operates a reed relay RR3 having contacts RR3-1, RR3-2, and RR3-3. When these close, they connect the transistors U1 and U2 to the meter M for that period of time.

If the voltages applied to the transistors U1 and U2 are within the limits set by the variable resistors VR1 and VR2, nothing occurs. However, the voltage from an amplifier IC5 which represents average weld current is applied to the anode of the transistor U1 through the contacts RR3-1. If that voltage exceeds the set voltage, the transistor U1 fires and turns on a semi-conductor controlled rectifier Q1 which lights a signal lamp designated "Hi." The SCR Q1 also shorts out a reed relay RR4 to prevent further welding until it is reset by the push button switch PB4. For this purpose, the contacts of the reed relay RR4 are wired into the starting circuit of the stud welding circuit and, when opened, prevent another cycle from being initiated.

With the reed relay contacts RR3-2 closed, the gate voltage of the transistor U2 is pulled down to the voltage representing weld current from the amplifier IC5. If that voltage is lower than the voltage set on the anode by the variable resistor VR2, the transistor U2 turns on a semiconductor controlled rectifier. This SCR again shorts out the reed relay RR4 and turns on a low current indicator light designated "Lo." The reed relay RR4 again prevents another weld cycle from taking place until it is reset.

When welding with studs using reverse polarity, a switch PB5 is actuated to maintain the same positive readings on the meter M.

The numerous contacts of the push button switches are necessary only to meet the physical requirements of the printed circuit board and other physical considerations of the actual welding system.

The monitoring of the weld current is important because of the many variables in terms of variations in the power source, the length of the welding cables, ambient temperatures, etc., which can effect this value. On the other hand, monitoring of the time of the welding cycle is not required because of the accurate electronic timing devices now available and because there are no external variables which cause variations in the timing period.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for end welding a stud to a workpiece comprising means for holding a stud, an electrically operated retraction coil for retracting the stud-holding means away from the workpiece, means including a conductor for supplying electrical power to said retraction coil, current means including a conductor for supplying welding current to said stud-holding means, a shunt associated with said current means for effecting an electrical signal responsive to the magnitude of the welding current, a first capacitor, means responsive to the signal for charging said first capacitor, a second capacitor, a constant source of current for charging said second capacitor, means associated with one of said conductors for connecting said shunt to said first capacitor and for connecting said constant source of current to said second capacitor while current is flowing through the associated conductor, a meter, means for selectively connecting said first capacitor and said second capacitor to said meter, means for preventing an additional weld cycle if the welding current for the previous cycle was below a predetermined minimum, and means for preventing an additional weld cycle if the welding current for the previous cycle was above a predetermined maximum.

2. Apparatus according to claim 1 characterized by said means associated with one of said conductors comprises a relay connected in parallel with said electrically operated retraction coil.

3. Apparatus according to claim 1 characterized by a third capacitor connected to said constant source of current for being charged by same, and means for discharging said third capacitor at the end of the weld cycle and for discharging said second capacitor at the beginning of the next weld cycle.

4. Apparatus for end welding a stud to a workpiece comprising means for holding a stud, electrically operated means for retracting the stud-holding means away from the workpiece, means including a conductor for supplying electrical power to said retracting means, current means including a conductor for supplying welding current to said stud-holding means, a shunt connected with said current means conductor for effecting an electrical signal responsive to the magnitude of the welding current, a first capacitor, an operational amplifier for charging said first capacitor in response to the signal from said shunt, a second capacitor, a constant source of current for charging said second capacitor, means associated with one of said conductors for connecting said shunt to said first capacitor and for connecting said constant source of current to said second capacitor while current is flowing through the associated conductor, a meter, manually operated means for selectively connecting said first capacitor and said second capacitor to said meter to provide a visual indication of the average weld current and the time of the weld cycle, means for preventing an additional weld cycle if the welding current for the previous cycle was below a predetermined minimum, and means for preventing an additional weld cycle if the weld current for the previous cycle was above a predetermined maximum.

5. Apparatus for welding a stud to a workpiece comprising means for holding a stud, electrically operated means for retracting the stud-holding means away from the workpieece, power means for supplying electrical power to said electrically operated means, current means for supplying welding current to said stud-holding means, means associated with said current means for effecting an electrical signal responsive to the magnitude of welding current, first means responsive to the signal for producing a first voltage, a constant source of current, second means including a capacitor responsive to said constant source of current for producing a second voltage, the magnitude of which is dependent on the time said constant source of current and said capacitor are connected together, switch means associated with one of said power means and said current means for connecting said first means to said signal means and for connecting said constant source of current to said capacitor while the associated one of said power means and current means is supplying power, a meter, manually operated means for selectively connecting said first means and said capacitor to said meter to provide a visual indication of the average weld current and the time of the weld cycle, an additional capacitor, and means connected in circuit with the first capacitor and said additional capacitor so that one of said capacitors is discharged at the end of a weld cycle and the other of said capacitors is discharged at the beginning of the next weld cycle.

* * * * *